April 9, 1957 V. R. ANDERSON 2,788,198

AIR CONDITIONING APPARATUS

Filed Sept. 30, 1952 4 Sheets-Sheet 1

INVENTOR.
Verne R. Anderson,
by John B. Brady
ATTORNEY

April 9, 1957 V. R. ANDERSON 2,788,198

AIR CONDITIONING APPARATUS

Filed Sept. 30, 1952 4 Sheets-Sheet 2

INVENTOR.
Verne R. Anderson,
BY
John B. Brady
ATTORNEY

April 9, 1957 V. R. ANDERSON 2,788,198

AIR CONDITIONING APPARATUS

Filed Sept. 30, 1952

4 Sheets-Sheet 3

INVENTOR.
Verne R. Anderson,
BY
John B. Brady
ATTORNEY

April 9, 1957 V. R. ANDERSON 2,788,198

AIR CONDITIONING APPARATUS

Filed Sept. 30, 1952 4 Sheets-Sheet 4

INVENTOR.
Verne R. Anderson,
BY
John B. Brady
ATTORNEY 2,788,198
Patented Apr. 9, 1957

2,788,198

AIR CONDITIONING APPARATUS

Verne R. Anderson, Tucson, Ariz.

Application September 30, 1952, Serial No. 312,330
3 Claims. (Cl. 261—29)

My invention relates broadly to air conditioning apparatus, and more particularly to a humidity control attachment for blower fans.

One of the objects of my invention is to provide a humidity control attachment for blower fans which may be readily applied to conventional types of air circulating fans and the driving motor for the air circulating fan employed for operating the humidity control apparatus.

Another object of my invention is to provide a construction of humidity control attachment for blower fans in which a coupling may be established from the operating motor of the blower fan to a water elevating pump for effecting a recirculation of water through filter pads associated with the blower fan for controlling conditions of humidity simultaneously with the operation of the blower fan.

Another object of my invention is to provide an improved construction of recirculating pump which may be submerged in a drain pan adjacent the base of a blower fan and operated simultaneously with the operation of the blower fan for recirculating the water through filter pads associated with the blower fan for controlling conditions of humidity simultaneously with the operation of the blower fan.

Still another object of my invention is to provide a construction of recirculating water pump which may be readily coupled through a flexible drive shaft with the driving motor of a blower fan, for recirculating water through filter pads associated with the blower fan simultaneously with the operation of the blower fan for continuously controlling humidity conditions as air is circulated by the blower fan.

Still another object of my invention is to provide a construction of cable driven recirculating pump which may be driven by the same motor which drives the blower fan of an air conditioner, for recirculating cooling fluid through filter pads associated with the blower fan where the recirculating pump contains a volute scroll described according to an exponential curve for a pump, elevating and discharging a stream of cooling fluid with a very high degree of efficiency.

Still another object of my invention is a structural arrangement for mounting a flexible cable coupling means with respect to the driving motor of a blower fan and with respect to a centrifugal pump supported on the casing of the blower fan and submerged in a water collecting tray beneath the fan, for recirculating a cooling fluid through filter pads associated with the blower fan.

Figures 1, 2, 11:
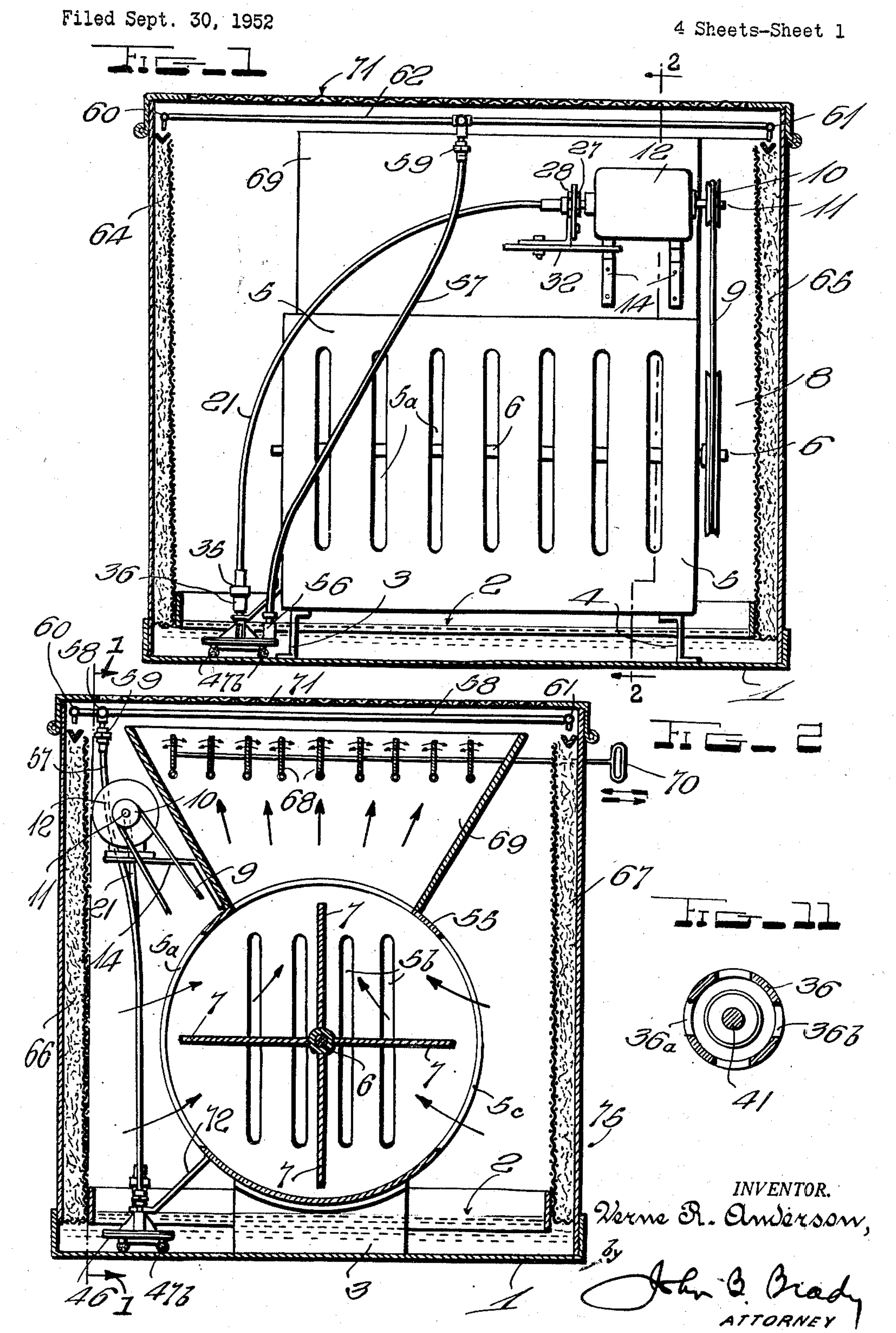
Figures 3, 4, 8:
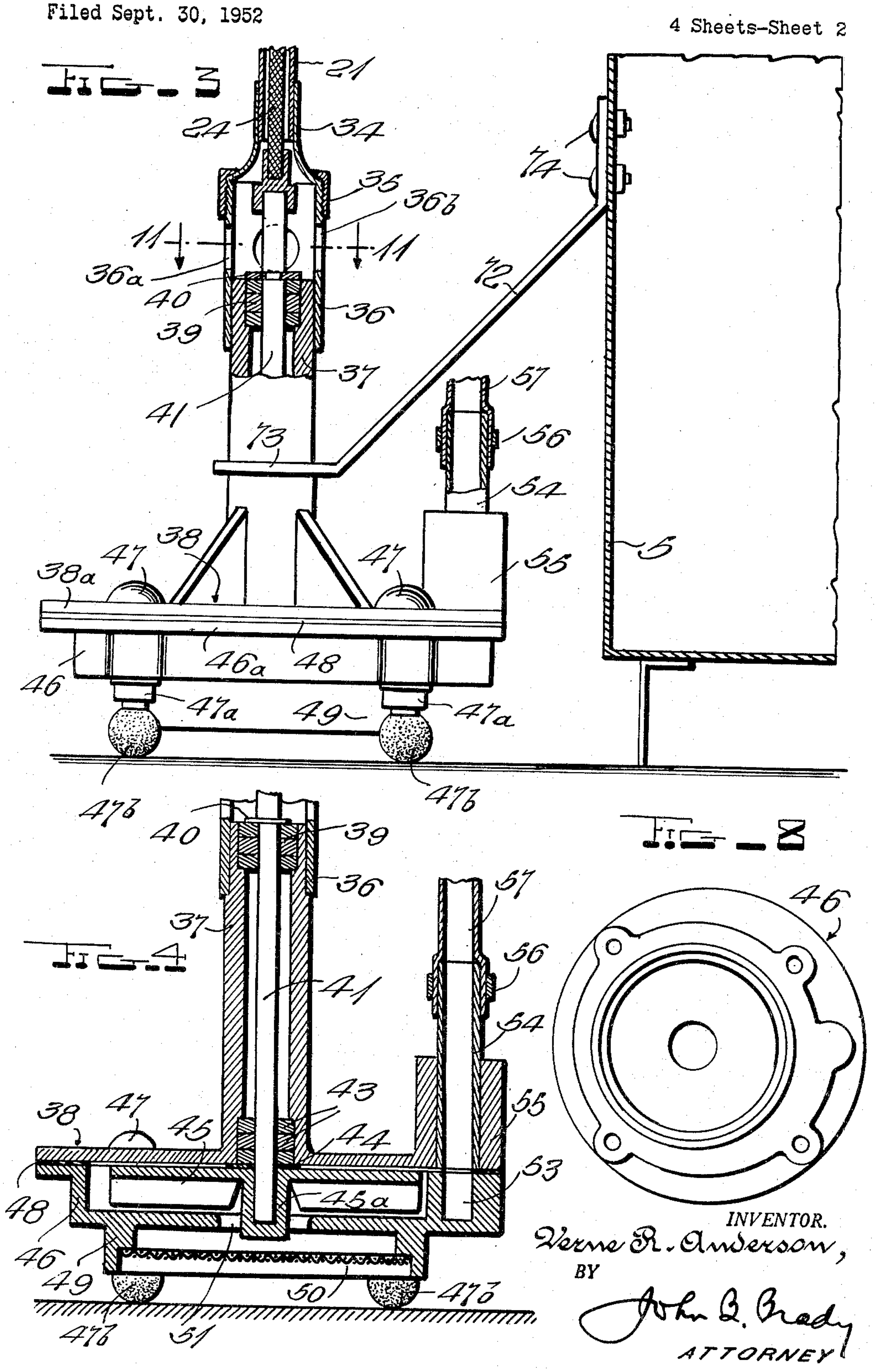
Figures 5, 6, 7, 9, 10:
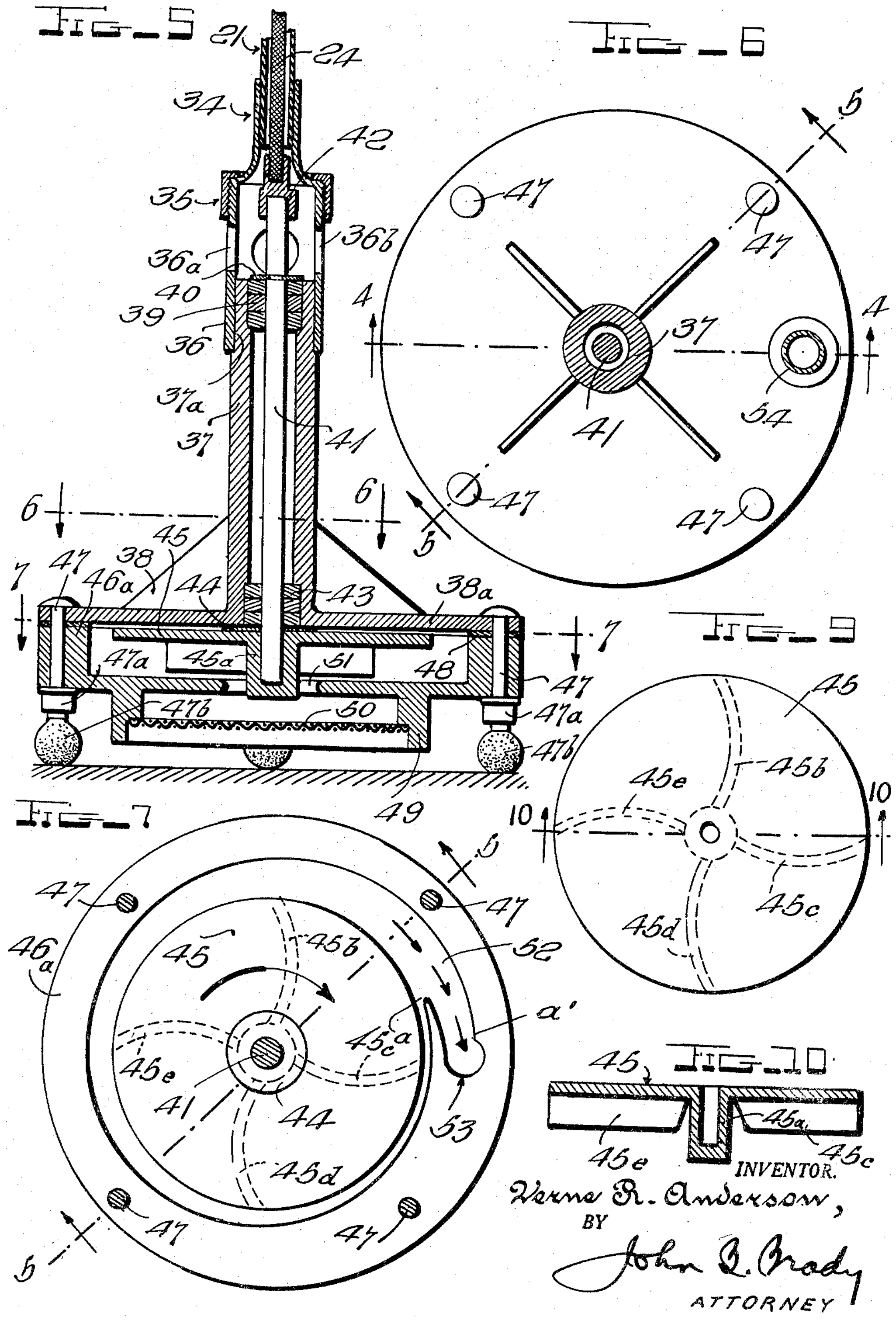
Figures 12, 13, 14, 15, 16:
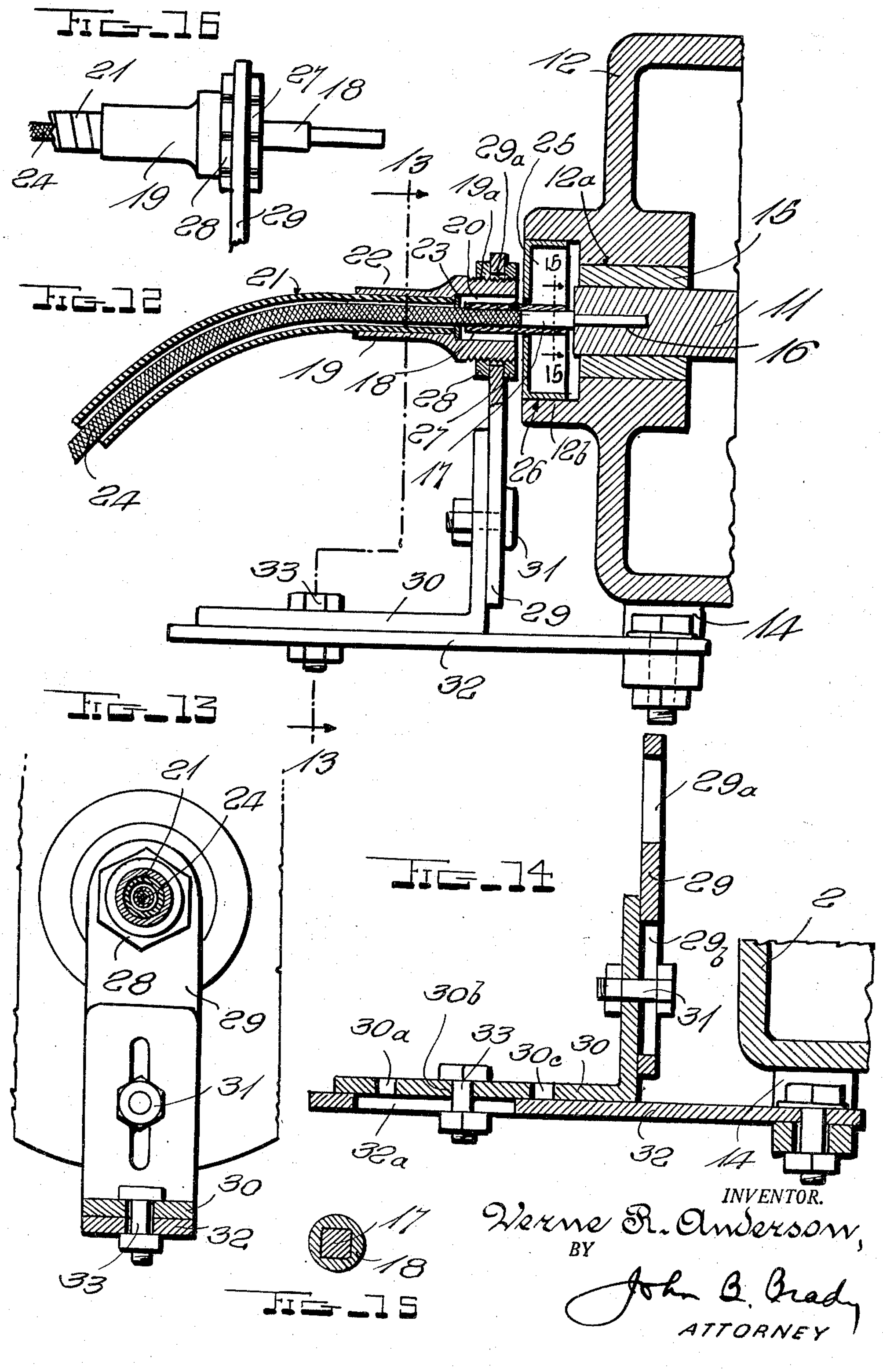

Other and further objects of my invention reside in the construction of attachment means for the driving motor of a blower fan by which the driving motor also operates a water recirculating pump for controlling humidity conditions under which the blower fan operates, as set forth more fully in the specification hereinafter following by reference to the accompanying drawings, in which:

Figure 1 is a vertical sectional view taken through an air conditioning unit substantially on line 1—1 of Fig. 2, and illustrating the driving motor which simultaneously operates both the blower fan and the recirculating pump for controlling conditions of humidity; Fig. 2 is a transverse vertical sectional view taken substantially on line 2—2 of Fig. 1; Fig. 3 is a side elevational view of the recirculating pump with parts broken away and shown in section, and illustrating the manner of attachment with the blower fan casing; Fig. 4 is a vertical sectional view through the recirculating pump taken substantially on line 4—4 of Fig. 6; Fig. 5 is a vertical sectional view through the recirculating pump taken substantially on line 5—5 of Figs. 6 and 7; Fig. 6 is a horizontal sectional view taken substantially on line 6—6 of Fig. 5, and illustrating in plan the top of the recirculating pump; Fig. 7 is a horizontal sectional view taken substantially on line 7—7 of Fig. 5 and illustrating the volute and the rotor therein and the coaction thereof, for whipping the water centrifugally outwardly and upwardly through the flexible discharge leading from the recirculating pump to the distributing pipe at the top of the casing of the air conditioning unit; Fig. 8 is a bottom plan view of the casing; Fig. 9 is a top plan view of the rotor of the centrifugal pump showing the vanes beneath the rotor; Fig. 10 is a vertical sectional view through the rotor substantially on line 10—10 of Fig. 9; Fig. 11 is a horizontal sectional view taken substantially on line 11—11 of Fig. 3 through the driving connection to the recirculating pump showing the openings for lubricating the pump; Fig. 12 is a fragmentary sectional view showing more particularly the association of the motor shaft with the flexible driving cable leading to the recirculating pump and illustrating the mounting means therefor; Fig. 13 is a sectional view taken substantially on line 13—13 of Fig. 12, showing particularly the adjustable bracket for mounting the flexible cable coupling from the recirculating pump to the driving motor; Fig. 14 is a sectional view taken substantially on line 14—14 of Fig. 13; Fig. 15 is a transverse sectional view taken substantially on line 15—15 of Fig. 12; and Fig. 16 is an elevational view of the coupling connection between the driving motor and the flexible cable leading to the recirculating pump.

My invention is directed to an attachment for blower fans for providing a humidity control system in association with the blower fan, utilizing the same motor which operates the blower fan for controlling the operation of a centrifugally operated recirculating pump, which is adapted to elevate cooling fluid from a tray beneath the blower fan and filter pads associated therewith, for distribution through the top of the filter pads for producing by recycling operations, evaporative cooling. I provide means for very readily mounting a centrifugally operated water recirculating pump in a position submerged in the water collecting tray adjacent the base of the apparatus, with a flexible drive shaft leading to the motor which drives the blower fan. Thus, the same motor which operates the blower fan also drives the centrifugally operated recirculating pump, thus obtaining dual use of the driving motor. Considerable saving in the consumption of electric power may be obtained as the blower motor is also employed to operate the recirculating pump. Moreover, economies are effected in the operation of the centrifugally recirculating pump of my invention, as the cooling water may be used in the recycling operations with infrequent replenishments in the water supply.

Referring to the drawings in more detail, reference character 1 designates a supporting tray located at the base of the air conditioning unit, and into which water is replenished from time to time to water level 2 in the tray 1. An automatic fluid valve may be provided for replenishing the water supply from time to time. Within the tray 1, I provide supporting angles 3 and 4, serving as feet for mounting the frame of the blower fan, represented at 5, and through which blower fan shaft 6 is journalled for operating blower fan blade 7 from driven pulley 8 on the end of shaft 6. The driven pulley 8 is operated by belt 9 extending from driving pulley 10 on motor shaft 11 driven by electric motor 12.

The electric motor 12 is mounted on brackets 14 which are supported with respect to the frame 5 of the blower fan. The brackets 14 are illustrated more clearly in Figs. 12, 13 and 14, from which it will be noted that motor 12 is supported in a position projecting from one side of the frame of the blower fan, as shown more particularly in Fig. 2. The opposite end of shaft 11 of motor 12 is journalled in bearing 15, as shown more particularly in Fig. 12, and is recessed within the end of the electric motor 12, as represented at 12*a*. The end of the shaft 11 is provided with a key slot represented at 16, which is rectangular in section, into which the coupling member 17 extends. Coupling member 17 is of rectangular section, similar to the section of the key slot 16. The coupling member 17 projects outwardly and through the coupling sleeve 18, which is also of rectangular section. The coupling sleeve 18 projects outwardly from the end of the motor frame and into the cable ferrule 19. The cable ferrule 19 is apertured to receive the sleeve 18 at one end, as shown at 20, and is apertured to receive the end of the flexible cable housing 21 in the other end 22 thereof. A washer member 23 is interposed between the aperture 20 in cable ferrule 19 and the end 22 of the cable ferrule 19. The flexible cable housing 21 is positively maintained in the end 22 of the cable ferrule 19. Through the cable housing 21 there extends the flexible cable core 24, which extends through the end of the cable ferrule 22 and through washer member 23 and into the end of sleeve 18 which is attached to the coupling member 17 connected with motor shaft 11. Thus, a positive driving connection is secured between motor shaft 11 and cable core 24. A dust cap 25 is inserted over the sleeve 18, and is centered within the recess 26 in the end of the frame of the electric motor represented at 12*a*. The position of the cable ferrule 19 with respect to the end of the motor frame, is adjusted by means of the external screw threads 19*a* on the exterior surface of the cable ferrule 19, which screw threads are engaged by the adjustable locknuts 27 and 28 on opposite sides of the adjustable bracket member 29. The adjustable bracket member 29 is apertured at 29*a* for the passage of the cable ferrule 19, so that the cable ferrule 19 is gripped within the aperture 29*a* by the adjustable locknuts 27 and 28. The bracket member 29 forms parts of the universal adapter bracket for holding the upper end of the flexible cable assembly in cable housing 21 in position with relation to the blower motor 12. Bracket member 29 coacts with the angle member 30, which is adjustably fastened to one of the brackets 14 which supports the blower motor. The universal adjustment provided by the adapter bracket is accomplished by the coaction of the slot 29*b* in bracket member 29 and fastening bolt 31 with the angle member 30, whereby bracket member 29 is linearly adjustable toward or away from the motor mounting means on brackets 14 for exactly aligning the cable ferrule 19 with the sleeve 18. The angle member 30 is provided with a multiplicity of spaced apertures 30*a*, 30*b* and 30*c* therein, through which adjustable bolt member 33 extends and is engaged in elongated slot 32*a* in strip 32. Thus, the angle member 30 is longitudinally adjustable along the strip 32 in spatial relation to the end of the frame of the electric motor 12 to present bracket member 29 to a selected position along cable ferrule 19, thereby precisely controlling the position of the end of the flexible cable with respect to the end of the motor shaft 11.

The flexible cable housing 21, housing the cable core 24, extends through the air conditioning unit around the frame 5 of the blower fan, and extends through the cable ferrule 34 which is secured by the cable coupling sleeve 35 to the screw-threaded end of the cylindrical coupling 36. The cylindrical coupling 36 engages over the upwardly extending end 37 of the centrifugal pump housing 38. The upwardly extending end 37 is internally recessed at 37*a* for receiving the laminated fiber bearings represented at 39. A keeper key 40, engaged in a groove on the vertically extending impeller shaft 41, retains the laminated fiber bearings 39 in position. The cylindrical coupling 36 is apertured in the sides thereof, as represented at 36*a* and 36*b*, for facilitating the lubrication of the laminated fiber bearings 39. The upper end of the impeller shaft 41 fits into the cable tip 42 carried by the end of the cable core 24, whereby the rotary driving torque imparted by cable core 24 is transferred to the impeller shaft 41. Impeller shaft 41 extends downwardly through the upwardly extending end 37 of the pump housing 38, and passes through the laminated fiber bearings 43 adjacent the lower end of impeller shaft 41. Impeller shaft 41 then extends through the stainless steel spacer 44, and is secured to the impeller 45. The impeller 45 is mounted within the casing 46 of the pump, which connects with the pump housing 38 by means of bolt members 47, passing through aligned flanges 38*a* and 46*a* and through the gasket 48, forming a fluid-tight centrifugal pump casing. The bolt members 47 clamp the casing 46 to the pump housing 38 by means of securing nuts 47*a*, and in addition these bolt members support resilient feet 47*b* which serve to contact the bottom surface of the supporting tray 1 and elevate the centrifugal pump sufficiently above the bottom of supporting tray 1 to enable the water in the tray to be forced under vacuum pressure through the central intake aperture 51 and through the centrifugal pump to the water distribution system. These resilient feet 47*b* also absorb shock vibration which may be communicated to the centrifugal pump housing through the rotatively driven flexible shaft.

The centrifugal pump casing has a depending cylindrical portion 49 thereon, which serves as a support on the lower end thereof for the strainer or screen 50. The depending cylindrical portion 49 constitutes the intake for the centrifugal pump, having a central intake port 51, through which the sleeve 45*a* of the impeller 45 extends. The annular space between the projecting end of impeller 45*a* and port 51 serves as an intake for the water from the supporting tray 1 which is acted upon by the impeller 45, driven by shaft 41, to whip the water into the volute scroll within casing 46, which I have described more clearly in Fig. 7. The centrifugal recycling pump is designed for operation in a submerged condition below the water level 2 in tray 1, and the automatic replenishment of the water to supporting tray 1 insures an adequate supply of water submerging the pump for recycling operation. The volute scroll is designed on an exponential curve, starting at a point *a* and continuing through 360° to the point *a'*, as shown more particularly in Fig. 7. The vanes of the impeller 45 shown at 45*b*, 45*c*, 45*d* and 45*e* tend to centrifugally whip the water upwardly through the port 51 and outwardly along the volute path of the volute scroll 52 to the bottom of the recess 53 which forms a pocket toward which the end of the discharge tube 54, which is mounted in the extension 55 of pump housing 38, is axially directed. The discharge tube 54 thus receives the water which is pumped by the centrifugal action of the impeller 45 and forced upwardly through discharge tube 45 and through coupling 56 to the flexible hose 57. The flexible hose 57 connects at the top of the air conditioning unit to a water distribution system shown more particularly in Figs. 1 and 2. The water distribution system comprises a transversely extending manifold 58, to which the flexible hose 57 connects through coupling 59. The manifold 58 extends in opposite directions and connects with transversely extending distribution pipes 60 and 61 through pipes 62 and 63.

Distribution pipes 60 and 61 provide drip apertures through which the water is permitted to drip into filter pads arranged in the sides of the casing of the air conditioning unit, and represented at 64, 65, 66 and 67. The continuous supply of water to these filter pads enables moisture to be imparted to the air which is drawn through the side walls of the housing by the operation of the blower fan 7. As the water gravitates through the filter pads, it returns to the supporting tray 1 to the level 2 below which the recirculating pump is submerged, and it performs a recycling operation as hereinbefore described.

The amount of air delivered by the blower, properly humidified by the moisture in the filter pads 64, 65, 66 and 67, is controlled by the angularly movable louvers 68 located in the discharge duct 69 of the frame 5 of the blower fan, and controlled from the outside of the air conditioning unit by means of manual control 70 for regulating the discharge of properly humidified air through the grill 71. The intake for the blower fan 7 is through the frame 5 of the blower fan and the slots which are provided on all four sides of the frame 5, as represented at *5a*, *5b*, *5c*, etc. The path of air follows the course represented by the arrows in Figs. 1 and 2 through the filter pads located in the side walls of the frame of the air conditioning unit, which I have designated generally as 75.

In order to stabilize the operation of the centrifugal pump, I provide a hold down bracket 72, as shown in Fig. 3, which is provided with a horizontally extending foot 73, which surrounds the pump housing 38, and is secured at the upper end thereof by screw threaded bolts 74 to the frame 5 of the blower fan.

I have found the air conditioner of my invention highly practical in its operation, as the motor already existent on the blower fan may be utilized to operate the centrifugal water elevating pump without imposing excessive loads upon the motor. While I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States, is as follows:

1. Air conditioning apparatus comprising a frame structure, a fan housing, a blower fan journaled within said fan housing, a supporting tray for fluid, a fluid distribution system adjacent the top of said frame structure, a recycling pump adjacent one end of said fan housing for elevating fluid from said supporting tray to said water distribution system, a driving motor located adjacent the other end of said fan housing, bracket means attached to said fan housing for supporting said motor with the driving axis thereof extending parallel to the driven axis of said blower fan and mounted within the limits of said fan housing, means for driving said blower fan from one end of said motor, a flexible shaft extending longitudinally and externaly of said fan housing between said recycling pump and the other end of said motor and means for longitudinally adjusting the position of the end of said flexible shaft with respect to the last mentioned end of said motor for insuring the continuous positive operation of said recycling pump simultaneously with the operation of said blower fan.

2. Air conditioning apparatus as set forth in claim 1 in which the means for longitudinally adjusting the position of said flexible shaft with respect to the last mentioned end of said motor is supported from the bracket means which supports said motor.

3. Air conditioning apparatus as set forth in claim 1 in which said means for longitudinally adjusting the position of the flexible shaft with respect to the last mentioned end of said motor consists of a bracket member which slidably engages said bracket means at one end and supports a cable housing in the other end thereof, said cable housing engaging said flexible shaft for rotatably supporting the shaft while allowing axial adjustment thereof between the end of said motor and the said recycling pump.

References Cited in the file of this patent

UNITED STATES PATENTS

| | | |
|---|---|---|
| 2,165,979 | Nicholson | July 11, 1939 |
| 2,387,473 | Spitzka | Oct. 23, 1945 |
| 2,631,021 | Arnold | Mar. 10, 1953 |